United States Patent
Trambitas et al.

(10) Patent No.: US 11,312,926 B2
(45) Date of Patent: Apr. 26, 2022

(54) POLYSILOXANE-CONTAINING CONCENTRATES WITH IMPROVED STORAGE STABILITY AND USE THEREOF IN TEXTILE CARE COMPOSITIONS

(71) Applicant: EVONIK OPERATIONS GMBH, Essen (DE)

(72) Inventors: Alexandra Trambitas, Alzenau (DE); Verena Dahl, Bergisch Gladbach (DE); Joachim Venzmer, Essen (DE); Jens Hildebrand, Johannesberg (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/650,344

(22) PCT Filed: Sep. 19, 2018

(86) PCT No.: PCT/EP2018/075323
§ 371 (c)(1),
(2) Date: Mar. 24, 2020

(87) PCT Pub. No.: WO2019/057754
PCT Pub. Date: Mar. 28, 2019

(65) Prior Publication Data
US 2020/0299616 A1  Sep. 24, 2020

(30) Foreign Application Priority Data
Sep. 25, 2017 (EP) .................... 17192823

(51) Int. Cl.
| | | |
|---|---|---|
| C11D 9/36 | (2006.01) | |
| C11D 3/37 | (2006.01) | |
| C11D 1/825 | (2006.01) | |
| C11D 3/00 | (2006.01) | |
| C11D 3/04 | (2006.01) | |
| C11D 3/20 | (2006.01) | |
| C11D 3/30 | (2006.01) | |
| C11D 3/382 | (2006.01) | |
| C11D 3/43 | (2006.01) | |
| C11D 3/50 | (2006.01) | |
| C11D 11/00 | (2006.01) | |
| C11D 1/66 | (2006.01) | |
| C11D 1/72 | (2006.01) | |
| C11D 1/722 | (2006.01) | |

(52) U.S. Cl.
CPC .......... *C11D 3/3742* (2013.01); *C11D 1/8255* (2013.01); *C11D 3/0015* (2013.01); *C11D 3/042* (2013.01); *C11D 3/2068* (2013.01); *C11D 3/2093* (2013.01); *C11D 3/30* (2013.01); *C11D 3/3738* (2013.01); *C11D 3/382* (2013.01); *C11D 3/43* (2013.01); *C11D 3/50* (2013.01); *C11D 11/0017* (2013.01); *C11D 1/662* (2013.01); *C11D 1/72* (2013.01); *C11D 1/722* (2013.01)

(58) Field of Classification Search
CPC ....................................................... C11D 1/82
See application file for complete search history.

(56) References Cited

U.S. PATENT DOCUMENTS

| | | |
|---|---|---|
| 4,339,391 A | 7/1982 | Hoffmann et al. |
| 5,066,414 A | 11/1991 | Chang |
| 5,391,321 A | 2/1995 | Gruning et al. |
| 5,525,245 A | 6/1996 | Grandmarie et al. |
| 5,645,842 A | 7/1997 | Gruning et al. |
| 5,886,201 A | 3/1999 | Bonastre et al. |
| 6,432,895 B1 | 8/2002 | Bigorra et al. |
| 6,958,410 B2 | 10/2005 | Koch et al. |
| 7,727,599 B2 | 6/2010 | Doehler et al. |
| 7,834,122 B2 | 11/2010 | Ferenz et al. |
| 8,183,199 B2 | 5/2012 | Fossum et al. |
| 8,557,944 B2 | 10/2013 | Henning et al. |
| 8,569,224 B2 | 10/2013 | Kohle et al. |
| 8,653,214 B2 | 2/2014 | Venzmer et al. |
| 8,658,581 B2 | 2/2014 | Hloucha et al. |
| 8,796,198 B2 | 8/2014 | Henning et al. |
| 8,883,713 B2 | 11/2014 | Parrish et al. |
| 8,920,786 B2 | 12/2014 | Hloucha et al. |
| 9,090,853 B2 | 7/2015 | Holderbaum et al. |
| 9,138,385 B2 | 9/2015 | Dahl et al. |
| 9,320,697 B2 | 4/2016 | Kleinen et al. |
| 9,353,289 B2 | 5/2016 | De Gans et al. |
| 9,441,187 B2 | 9/2016 | Köhle et al. |
| 9,745,251 B2 | 8/2017 | Klostermann et al. |
| 2004/0014627 A1 | 1/2004 | Adams et al. |

(Continued)

FOREIGN PATENT DOCUMENTS

| | | |
|---|---|---|
| DE | 197 51 151 | 5/1999 |
| DE | 19755488 | 6/1999 |

(Continued)

OTHER PUBLICATIONS

U.S. Appl. No. 15/867,964, filed Jan. 11, 2018, US-2018/0133133 A1, May 17, 2018, Kleinen.
English language translation of the International Search Report for corresponding PCT/EP2018/075323 filed Sep. 9, 2018.
English language translation of the Written Opinion of the International Searching Authority for corresponding PCT/EP2018/075323 filed Sep. 9, 2018.
International Preliminary Report on Patentability for PCT/EP2018/075323 filed Sep. 9, 2018.
Cassel, et al., "Original Synthesis of Linear, Branched and Cyclic Oligoglycerol Standards," *Eur. J. Org. Chem.* 2001(5):875-896 (Mar. 2001).

(Continued)

*Primary Examiner* — Charles I Boyer
(74) *Attorney, Agent, or Firm* — Law Office of: Michael A. Sanzo, LLC

(57) ABSTRACT

The invention relates to novel concentrates containing polysiloxanes having improved stability and improved performance properties and to the use thereof in laundry and cleaning formulations, preferably in fabric care compositions.

15 Claims, No Drawings

(56) References Cited

U.S. PATENT DOCUMENTS

| | | | |
|---|---|---|---|
| 2004/0142838 A1* | 7/2004 | Azuma | C11D 3/3734 510/285 |
| 2004/0142841 A1* | 7/2004 | de Buzzaccarini | C11D 3/0015 510/296 |
| 2004/0163182 A1 | 8/2004 | Nguyen | |
| 2006/0080786 A1* | 4/2006 | Evers | D06L 1/12 8/142 |
| 2006/0200914 A1* | 9/2006 | Evers | D06L 1/02 8/142 |
| 2006/0264352 A1 | 11/2006 | Sajic et al. | |
| 2007/0160652 A1 | 7/2007 | Mueller et al. | |
| 2007/0197678 A1 | 8/2007 | Cavaleiro et al. | |
| 2008/0004357 A1 | 1/2008 | Meyer et al. | |
| 2008/0305056 A1 | 12/2008 | Jenni et al. | |
| 2009/0124533 A1 | 5/2009 | Kottke et al. | |
| 2010/0104611 A1* | 4/2010 | Chan | A61K 8/11 424/401 |
| 2010/0184634 A1* | 7/2010 | Henault | C11D 1/62 510/515 |
| 2011/0239377 A1 | 10/2011 | Fossum et al. | |
| 2013/0012423 A1 | 1/2013 | Hloucha et al. | |
| 2013/0102520 A1 | 4/2013 | Holderbaum et al. | |
| 2013/0217930 A1 | 8/2013 | Haensel et al. | |
| 2015/0073069 A1* | 3/2015 | De Gans | C08K 5/544 523/435 |
| 2015/0297485 A1 | 10/2015 | Kleinen et al. | |
| 2017/0009184 A1 | 1/2017 | Schubert et al. | |
| 2018/0133133 A1 | 5/2018 | Kleinen et al. | |
| 2020/0283707 A1 | 9/2020 | Dahl et al. | |
| 2021/0277329 A1 | 9/2021 | Neubauer et al. | |

FOREIGN PATENT DOCUMENTS

| | | |
|---|---|---|
| DE | 102015223454 | 6/2016 |
| EP | 1 972 330 | 9/2008 |
| EP | 2 301 987 | 3/2011 |
| JP | H11508291 | 7/1999 |
| JP | 2002-167437 | 6/2002 |
| JP | 2002201494 | 7/2002 |
| WO | WO 93/16157 | 8/1993 |
| WO | WO 98/23808 | 6/1998 |
| WO | WO 02/086044 | 10/2002 |
| WO | WO 2008/040785 | 4/2008 |
| WO | WO 2011/123284 | 10/2011 |
| WO | WO 2011/123733 | 10/2011 |
| WO | WO 2014/018578 | 1/2014 |
| WO | WO 2014/143182 | 9/2014 |
| WO | WO 2016/055341 | 4/2016 |
| WO | WO 2018/001889 | 1/2018 |
| WO | WO 2020/007670 | 1/2020 |

OTHER PUBLICATIONS

DGF C-V 17a (53) Ph. Eur. 2.5.3 Method A, pp. 1-4 (downloaded Mar. 17, 2020).

Gooijer, et al., "Water and Energy Consumption in Domestic Laundering Worldwide—A Review," *Tenside Surf. Det.* 53(5):402-409 (2016).

Wang, et al., "Carbohydrate-Modified Siloxane Surfactants and Their Adsorption and Aggregation Behavior in Aqueous Solution," *J. Phys. Chem. B* 114(20):6872-6877 (May 2010).

U.S. Appl. No. 16/644,685, filed Mar. 5, 2020, Dahl.

U.S. Appl. No. 17/257,661, filed Jan. 4, 2021, Neubauer.

Office Action for copending U.S. Appl. No. 16/644,685, dated Sep. 13, 2021.

English translation for DE 102015223454 cited by and provided by Examiner in the Office Action for copending U.S. Appl. No. 16/644,685, dated Sep. 13, 2021.

English translation for WO 93/16157 cited by and provided by Examiner in the Office Action for copending U.S. Appl. No. 16/644,685, dated Sep. 13, 2021.

Response to Office Action for copending U.S. Appl. No. 16/644,685, dated Dec. 13, 2021.

Final Office Action for copending U.S. Appl. No. 16/644,685, dated Jan. 28, 2021.

\* cited by examiner

POLYSILOXANE-CONTAINING CONCENTRATES WITH IMPROVED STORAGE STABILITY AND USE THEREOF IN TEXTILE CARE COMPOSITIONS

CROSS REFERENCE TO RELATED APPLICATIONS

The present application is US national stage of international application PCT/EP2018/075323, which had an international filing date of Sep. 19, 2018, and which was published on Mar. 28, 2019. The PCT application claims priority to EP 17192823.7, filed on Sep. 25, 2017 which is hereby incorporated by reference in its entirety.

A. FIELD OF THE INVENTION

The invention relates to novel concentrates containing polysiloxanes having improved stability and improved performance properties and to the use thereof in laundry and cleaning formulations, preferably fabric care compositions.

B. PRIOR ART

Polysiloxanes are used as standard as additives in fabric care compositions to achieve advantageous effects (for example better soft hand, wrinkle resistance etc.). A disadvantage of polysiloxanes is their poor formulability on account of their very hydrophobic character. The fabric softener formulations resulting therefrom are additionally not stable for long enough. Phase separation takes place for example. Examples of such polysiloxanes may be found in EP 2 557 107 A1.

The amino-functional polysiloxanes of EP 2 557 107 A1 and the formulations thereof exhibit increasing yellowing according to the storage conditions. In addition, the viscosity of the polysiloxanes can increase to the point of gelling upon storage.

Attempts have hitherto been made to at least partly overcome the problems encountered when employing polysiloxanes through a preformulation of the polysiloxanes as a macro- or microemulsion. Preformulation of the polysiloxanes as a macroemulsion or microemulsion led to an improved formulability which resulted in an improved storage stability of the fabric softener. However, the viscosity problem was, if anything, exacerbated by preformulation as a macro- or microemulsion. The shelf life of such preformulations and of the N-containing polysiloxanes contained is too low for problem-free practical applicability, particularly at higher temperatures.

The problem addressed by the present invention is that of overcoming at least one of the disadvantages of the prior art. Further problems addressed by the present invention and not mentioned explicitly will become apparent from the overall context of the following description, examples and claims.

C. DESCRIPTION OF THE INVENTION

It is now been found that, surprisingly, concentrates comprising the components
A) at least one polysiloxane
B) at least one ester or mineral oil,
C) at least one nonionic surfactant,
D) at least one nonaqueous solvent,
E) optionally water
F) optionally one or more acids wherein the content of components E) and F) in total based on the overall weight of the concentrates is between 0 and 5% by weight are extremely storage-stable and preferably clear and accordingly solve the problem addressed.

Without wishing to be bound to a particular theory the inventors believe that due to water being absent or largely absent from the concentrates according to the invention and the addition of one or more ester and/or mineral oils hydrolysis of the polysiloxanes is retarded or even prevented and thus the viscosity problem and the yellowing problem have been solved. It was further found that the concentrates according to the invention are self-emulsifying and may very easily be dispersed/formulated in a fabric softener formulation. This is surprising since rather hydrophilic surfactants are typically not miscible with and do not form stable, clear concentrates with the very hydrophobic polysiloxanes.

It is accordingly one advantage of the present invention that the concentrates may be processed into fabric softener formulations even after relatively long term storage. Compared to fabric softener formulations of the prior art, fabric softener formulations containing the concentrates according to the invention additionally showed
  improved soft hand in fabrics, especially in fabrics composed of cotton materials, and
  better perfume retention.

A further advantage of the present invention is that freely choosable very hydrophobic oils such as vegetable oils can be incorporated in a certain proportion to give a clear formulation and hence can likewise be formulated easily.

Another advantage of the present invention is that the concentrates and laundry/cleaning formulations according to the invention can do without preservatives, though their addition is not precluded.

In the context of the present invention, the term "fatty acids" is to be understood as meaning in particular formic acid, acetic acid, propionic acid, butyric acid, valeric acid, caproic acid, enanthic acid, caprylic acid, pelargonic acid, capric acid, lauric acid, myristic acid, pentadecanoic acid, palmitic acid, margaric acid, stearic acid, nonadecanoic acid, arachic acid, behenic acid, lignoceric acid, cerotic acid, montanic acid, melissic acid, undecylenoic acid, myristoleic acid, palmitoleic acid, petroselic acid, oleic acid, elaidic acid, vaccenic acid, gadoleic acid, eicosenoic acid, cetoleic acid, erucic acid, nervonic acid, linoleic acid, alpha-linolenic acid, gamma-linolenic acid, calendulic acid, punicic acid, alpha-eleostearic acid, beta-eleostearic acid, arachidonic acid, timnodonic acid, clupanodonic acid, cervonic acid, vernolic acid, ricinoleic acid, particular preference being given to those having a chain length of 6 to 24, preferably 6 to 22 and especially 8 to 18 carbon atoms; the same applies to the carbon base skeleton for the term "fatty alcohols" used in connection with the invention.

Unless stated otherwise, all percentages (%) given are percentages by mass.

All conditions such as pressure and temperature, for example, unless stated otherwise, are standard conditions (20° C., 1 bar).

In the context of the present invention the term "concentrates" is to be understood as meaning formulations containing fabric care active ingredients (active substances) having a very low water content. The terms "concentrate" and "active ingredient composition" are used synonymously. The concentrates can either be used as laundry and cleaning formulations, in particular as fabric softeners, themselves or can be used for the production thereof. When the concentrates are used for producing laundry and cleaning formulations the production comprises dilution of the concentrate and generally addition of further additives. The dilution is preferably effected with water and/or an organic solvent.

The present invention provides concentrates according to Claim 1, a process for producing laundry and cleaning formulations according to Claim 12, and for the use of the concentrates according to the invention for producing fabric softener formulations according to Claim 13. Preferred embodiments are claimed in the dependent claims.

The present invention in particular provides a concentrate suitable for production of or for use as a laundry and cleaning formulation, preferably as fabric softener, comprising the components A) one or more polysiloxanes,
B) one or more ester or mineral oils,
C) one or more nonionic surfactants, preferably selected from the group consisting of fatty alcohol ethoxylates and glycerol-based surfactants,
D) one or more nonaqueous solvents,
E) optionally water
F) optionally one or more acids wherein the content of components E) and F) in total based on the overall weight of the concentrates is between 0 and 5% by weight.

Each of the components A) to D) and F) can be in the form of a pure substance or as a mixture of two or more substances, for examples as a mixture of two or more polysiloxanes for component A or as a mixture of two or more ester or mineral oils for component B. A preferred concentrate is characterized in that it contains the components A) in an amount, in sum total of all polysiloxanes present, of 20% by weight to 80% by weight, preferably 25% by weight to 80% by weight, particularly preferably 30% by weight to 80% by weight, especially preferably 40% by weight to 75% by weight, and most preferably 45% by weight to 75% by weight,
B) in an amount, in sum total of all ester and mineral oils present, of 5% by weight to 50% by weight, preferably 5% by weight to 45% by weight, particularly preferably 5% by weight to 40% by weight, especially preferably 5% by weight to 35% by weight, and most preferably 10% by weight to 35% by weight,
C) in an amount, in sum total of all nonionic surfactants present, of 1% by weight to 25% by weight, preferably 1% by weight to 20% by weight, particularly preferably 2% by weight to 20% by weight, especially preferably 2% by weight to 15% by weight, and most preferably 5% by weight to 15% by weight,
D) in an amount, in sum total of all solvents present, of 0.1% by weight to 50% by weight, preferably 0.1% by weight to 40% by weight, particularly preferably 0.1% by weight to 35% by weight, very particularly preferably 0.1% by weight to 30% by weight, especially preferably 0.1% by weight to 25% by weight, very specially preferably 0.5% by weight to 20% by weight, and most preferably 1% by weight to 15% by weight,
E) in an amount of 0% by weight to 3% by weight, preferably 0% by weight to 2% by weight, particularly preferably 0% by weight to 1% by weight, very particularly 0% by weight to 0.5% by weight and most preferably 0% by weight and
F) in an amount, in sum total of all acids present, of 0% by weight to 3% by weight, preferably 0% by weight to 2% by weight, particularly preferably 0% by weight to 1% by weight, very particularly 0% by weight to 0.5% by weight and most preferably 0% by weight, wherein the % by weight values are based on the overall composition of the concentrate and the amounts of the individual components A) to F) and optionally further components are chosen such that in total they add up to 100% by weight of the concentrate.

Used as component A) are siloxanes/polysiloxanes, in particular amino-functional polysiloxanes, polyethersiloxanes, polysiloxanes having long-chain alkyl radicals or mixtures thereof, particularly preferably amino-functional polysiloxanes.

Used here to describe the siloxanes is a notation analogous to the literature: Walter Noll, Chemie and Technologie der Silicone [Chemistry and technology of silicones], Verlag Chemie GmbH, 2nd edition, 1968. The polysiloxanes according to the invention have different siloxane units which can be combined with one another in different ways in the molecule. In the context of the present invention, the terms "polysiloxane" and "siloxane" are used synonymously.

The composition of the siloxane units is obtained taking account of the fact that each oxygen atom acts as a bridging member between every two silicon atoms and accordingly only a half is assignable to each silicon atom. The various siloxane units are joined to one another via 2 half oxygen atoms ($-O_{1/2}O_{1/2}-$) groups, thus forming an oxygen bridge ($-O-$).

In a first preferred embodiment of the present invention component A) is an amino-functional polysiloxane of formula 1

$$M_a D_b D^A_c D^B_d D^C_e T_f T^A_g Q_h \qquad \text{(formula 1)}$$

wherein
$M=[R^2 R^1_2 SiO_{1/2}]$
$D=[R^1_2 SiO_{2/2}]$
$D^A=[R^1 Si(R^7 NHR^3)O_{2/2}]$
$D^B=[R^1 SiR^4 O_{2/2}]$
$D^C=[R^1 SiR^5 O_{2/2}]$
$T=[R^1 SiO_{3/2}]$
$T^A=[Si(R^7 NHR^3)O_{3/2}]$
$Q=[SiO_{4/2}]$
where $R^1$ are independently of one another identical or different, linear or branched, saturated or unsaturated hydrocarbon radicals having 1 to 30, preferably 1 to 18, particularly preferably 1 to 6, especially preferably 1 to 3 carbon atoms or else aromatic hydrocarbon radicals having 6 to 30 carbon atoms, preferably methyl or phenyl, particularly preferably methyl, $R^2$ are independently of one another identical to $R^1$, a linear or branched, saturated or unsaturated alkoxy radical having 1 to 30, preferably 1 to 18, particularly preferably 1 to 6, especially preferably 1 to 3 carbon atoms or a hydroxyl group, preferably $R^1$, particularly preferably methyl, $R^3$ are independently of one another hydrogen or a nitrogen-substituted hydrocarbon radical having 1 to 30, preferably 1 to 18, particularly preferably 1 to 6, especially preferably 1 to 3 carbon atoms, preferably an aminoethyl radical or hydrogen, particularly preferably hydrogen, $R^4$ are independently of one another identical or different, linear or branched, saturated or olefinically unsaturated hydrocarbon radicals having 8 to 30 carbon atoms, preferably decyl-, dodecyl-, tetradecyl-, hexadecyl-, octadecyl-, particularly preferably hexadecyl- and octadecyl-, $R^5$ are independently of one another identical or different, linear or branched, saturated or unsaturated polar hydroxyl-substituted amide radicals having 1 to 30 carbon atoms and/or linear or branched, saturated or unsaturated polar hydroxyl-substituted urea derivatives having 1 to 30 carbon atoms and/or hydroxyl-substituted carbamate radicals having 1 to 30 carbon atoms and/or ethoxylated amine radicals having 1 to 80, preferably 1 to 40, particularly preferably 1 to 30 carbon atoms and/or guanidine radicals or alkylenylguanidine radicals having 1 to 30 carbon atoms, $R^7$ are independently of one another identical or different, linear or branched, saturated or unsaturated, divalent hydrocarbon groups having 1 to 20 carbon atoms, preferably having 1 to 6 carbon atoms, particularly preferably —$C_2H_4$— and —$C_3H_6$—, most preferably a is 2-20, preferably 2 to 10, particularly preferably 2 to 5, very particularly preferably 2 to 3 and most preferably 2, b is 10 to 5000, preferably 20 to 2000, particularly preferably 20 to 1000, c is 1 to 500, preferably 1 to 250, particularly preferably 1 to 100, very particularly preferably 1 to 50 and most preferably 1 to 30, d is 0 to 500, preferably 0 to 250, particularly preferably 0 to 100, very particularly preferably 0 to 50 and most preferably 0 to 30, e is 0 to 500, preferably 0 to 250, particularly preferably 1 to 100, very particularly preferably 1 to 50 and most preferably 1 to 30, f is 0 to 20, preferably 0 to 10, particularly preferably 0 to 5, very particularly preferably 0 to 2 and most preferably 0, g is 0 to 20, preferably 0 to 10, particularly preferably 0 to 5, very particularly preferably 0 to 2 and most preferably 0, h is 0 to 20, preferably 0 to 10, particularly preferably 0 to 5, very particularly preferably 0 to 2 and most preferably 0, or ionic adducts thereof with protic reactants $H^+A^-$.

It is particularly preferable when $R^5$ is a substituent selected from the group of substituents of formulae 1a to 1j,

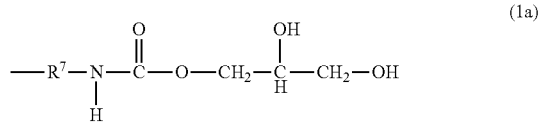
(1a)

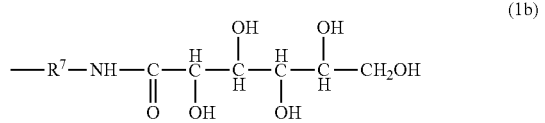
(1b)

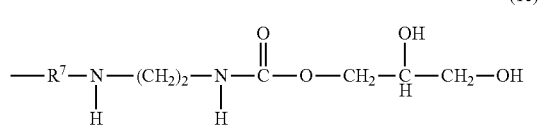
(1c)

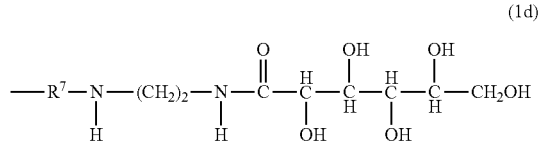
(1d)

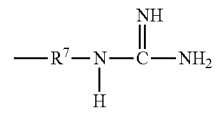
(1e)

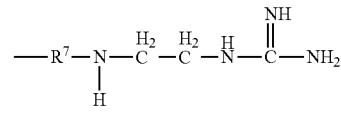
(1f)

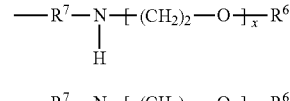
(1g)

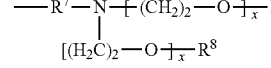
(1h)

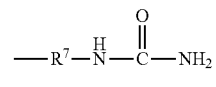
(1i)

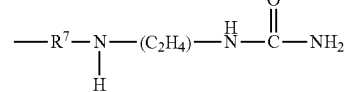
(1j)

wherein $R^6$ is hydrogen, a hydrocarbon radical, an acyl radical, a carboxylate radical or a carbamate or carbonate radical, particularly preferably hydrogen and $CH_3$—$C(O)$, and x is 1 to 20, preferably 1 to 10, particularly preferably 1 to 5 and in particular 1 to 2.

The invention also provides the abovementioned ionic adducts of the polysiloxanes of formula (1) used in accordance with the invention with acids of general formula $H^+A^-$. The anions $A^-$ are identical or different counterions to the positive charges selected from inorganic or organic anions of the acids $H^+A^-$ and derivatives thereof. Preferred anions are for example chloride, sulfate or hydrogen sulfate, carbonate or hydrogencarbonate, phosphate or hydrogenphosphates, acetate or homologous carboxylates having linear or branched, saturated or olefinically unsaturated alkyl chains, aromatic carboxylates, carboxylates formed from amino acids, citrates, malonates, fumarates, maleates, substituted and unsubstituted succinates and carboxylates formed from L-hydroxycarboxylic acids, for example lactate. The inventive siloxanes and the ionic adducts thereof may be present in dissociation equilibria depending on the stability of the adduct formed.

In a second preferred embodiment of the present invention component A) is a polyethersiloxane or polysiloxanes having long-chain alkyl radical of formula 2.

$$M_i M^1_j D_k D^1_l D^2_m T_n Q_o \quad \text{(formula 2)}$$

wherein
$M=[R^2R^1_2SiO_{1/2}]$
$M^1=[R^1R^{10}_2SiO_{1/2}]$
$D=[R^1_2SiO_{2/2}]$
$D^1=[R^1R^{10}SiO_{2/2}]$
$D^2=[R^1R^{13}SiO_{2/2}]$
$T=[R^1SiO_{3/2}]$
$Q=[SiO_{4/2}]$
where
i is 0 to 20, preferably 1 to 10, particularly preferably 2 to 5, very particularly preferably 2 to 3 and most preferably 2, j is 0 to 20, preferably 0 to 10, particularly preferably 0 to 5, very particularly preferably 0 to 2 and most preferably 0, k is 3 to 450, preferably 5 to 350, particularly preferably 10 to 250, l is 0 to 60, preferably 0 to 50, particularly preferably 0 to 40, very particularly preferably 0 to 35 and most preferably 0 to 30, m is 0 to 60, preferably 1 to 50, particularly preferably 0 to 40, very particularly preferably 0 to 35 and most preferably 0 to 30, n is 0 to 20, preferably 0 to 10, particularly preferably 0 to 5, very particularly preferably 0 to 2 and most preferably 0, o is 0 to 20, preferably 0 to 10, particularly preferably 0 to 5, very particularly preferably 0 to 2 and most preferably 0, wherein $i+j \geq 2$ and $N=i+j+k+l+m+n \leq 500$, $j+l+m \geq 1$, $R^1$ and $R^2$ are as defined for formula 1, $R^{10}$ are independently of one another identical or different polyether radicals, preferably identical or different polyether radicals of general formula III

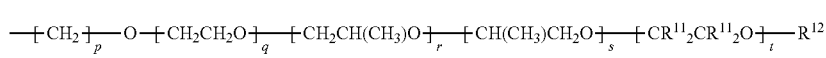
Formula 3 where $R^{11}$ are independently of one another identical or different alkyl radicals having 1 to 18 carbon atoms optionally having ether functions or aryl radicals having 6-18 carbon atoms optionally having ether functions or hydrogen, preferably hydrogen, ethyl and benzyl, $R^{12}$ are identical or different radicals from the group: $R^1$, hydrogen, —C(O)$R^1$, preferably methyl, butyl, hydrogen or —C(O)CH$_3$, $R^{13}$ are independently of one another identical or different, linear or branched, saturated or olefinically unsaturated hydrocarbon radicals having 8 to 30 carbon atoms, for example decyl-, dodecyl-, tetradecyl-, hexadecyl-, octadecyl-, in particular hexadecyl- and octadecyl-, p is 2 to 18, preferably 2 to 10, particularly preferably 2 to 5, very particularly preferably 2 to 5, in particular 2 to 3 and most preferably 3, q is 0 to 100, preferably 0 to 80, particularly preferably 0 to 70, very particularly preferably 0 to 60 and most preferably 0 to 50, r is 0 to 100, preferably 0 to 80, particularly preferably 0 to 70, very particularly preferably 0 to 60 and most preferably 0 to 50, s is 0 to 100, preferably 0 to 80, particularly preferably 0 to 70, very particularly preferably 0 to 60 and most preferably 0 to 50, t is 0 to 80, preferably 0 to 40, particularly preferably 0 to 20, very particularly preferably 0 to 10 and most preferably 0, with the proviso that $q+r+s+t \geq 3$.

The various monomer units in the siloxane chains specified in formulae 1 to 3 may take the form of alternating blocks with any number of blocks in any sequence or be subject to a random distribution. The indices used in the formulae should be regarded as statistical averages.

The siloxanes/polysiloxanes employed according to the invention may be produced when for example different functional siloxanes are reacted with terminally hydroxyl-functional polydimethylsiloxanes in a condensation process to afford multifunctional polysiloxanes, preferably end-capped polysiloxanes.

Thus for example to produce polysiloxanes of formula 1 in a first step aminoalkyl dialkoxysilanes may be further functionalized at the amino group and in a second step in controlled ratios to one another co-condensed with hydroxyl-functional polydimethylsiloxanes in the presence of trimethylsilyl group-liberating reagents.

The process is preferably based on the use of the compounds exemplarily recited below, wherein a) terminally hydroxyl-functional linear or branched polysiloxanes and mixtures thereof with dimethyldialkoxysilanes or methyltrialkoxysilanes or tetraethoxysilane, preferably linear terminally dihydroxyl-functional polysiloxanes, b) hexamethyldisilazane or disilazanes substituted with different carbon radicals, for example divinyltetramethyldisilazane, preferably hexamethyldisilazane;

c) 3-aminopropylmethyldialkoxysilanes, N-(2-aminoethyl)-3-aminopropylmethyldialkoxysilanes or further functional dialkoxysilanes containing linear or branched, saturated or unsaturated hydrocarbon radicals substituted with hydroxyl-substituted amides and/or the urea derivatives and/or hydroxyl-substituted carbamate structures and/or ethoxylated amines and/or guanidine- or alkylenylguanidine structures or are selected from the group of the substances of formulae 2a-k,

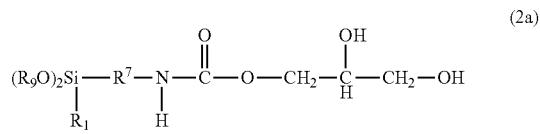
(2a)

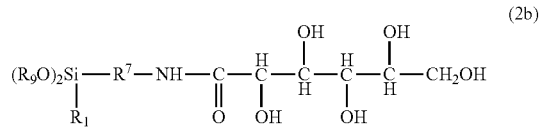
(2b)

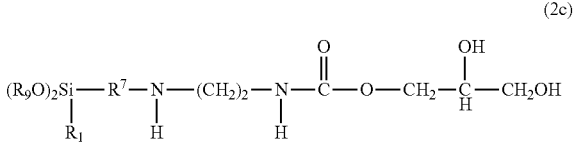
(2c)

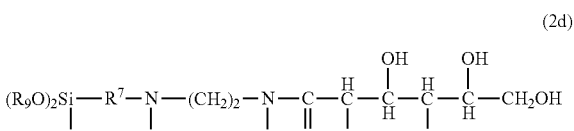
(2d)

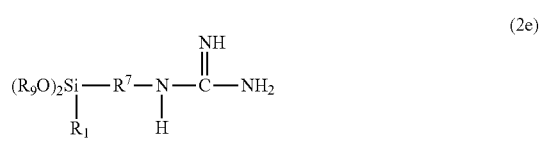
(2e)

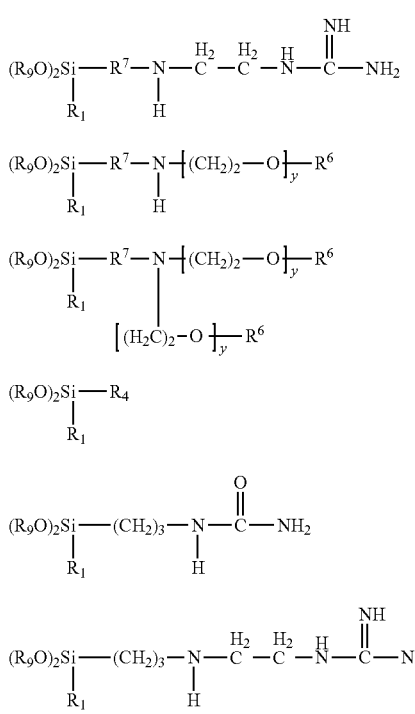

wherein $R_1$, $R_4$, $R_6$ and $R_7$ are as defined above in formula 1, $R_8=R_6$, preferably a hydrogen atom, a methyl or a carboxyl group, preferably H or acetyl, $R_9$ is an alkyl or acyl radical, in particular methyl, ethyl or acetyl and y=x, are reacted with one another. The silanes are advantageously employed as a monomer. Provided it is advantageous for the later application the silanes may be precondensed under hydrolytically acidic conditions to afford oligomers before the polymer construction is initiated through addition of the dihydroxy-functional polysiloxanes.

It may be advantageous to use the silazane used in a small excess over the stoichiometric amount. The dialkoxysilanes used are produced using methods of synthesis which are known in the prior art. Thus, the guanidination of amino-functional silanes is preferably effected similarly to the guanidination of aminosiloxanes which is described in JP 2002 167437. The reaction of amino-functional siloxanes with glycerin carbonate or gluconolactone is preferably effected according to EP 1 972 330 A1 and J. Phys. Chem. B 2010, Vol. 114, pp. 6872-6877.

Preferably used as catalysts for the hydrolysis and condensation reaction are carboxylic acids such as for example acetic acid, propionic acid, isononanoic acid or oleic acid. The reaction may be performed with the addition of small amounts of water for accelerating the hydrolysis; there is often sufficient moisture present in the reagents that are used in an undried state. The reaction may be performed without a solvent or in the presence of solvents, for example aliphatic and aromatic, protic and aprotic solvents, glycols, ethers, fatty alcohol alkoxylates, mono-, di- and triglycerides or oils of synthetic or natural origin. The use of solvents is advantageous for example when the chain lengths of the desired structures entail high viscosities. The solvent may be added before, during or after the reaction. The reaction may be performed at temperatures in the range from room temperature to 150° C., preferably at 50-100° C. The alcohols liberated in the hydrolysis are distilled off under vacuum during or after the reaction. A neutralization step and a filtration step may optionally be effected. Further details and examples concerning the production of polysiloxanes according to formula 1 may be found in EP 2 557 107 A1 which is hereby explicitly incorporated by reference into the subject matter of the description of the present invention.

Polysiloxanes of formula 2 may be produced for example as described in EP 0 596 304, EP 0 559 013, EP 2 301 987 or in "Silicones—an Introduction to their chemistry and applications"—G. G. Freeman.

Component B) is an ester or mineral oil.

In the context of the present invention the term "ester or mineral oil" is to be understood as meaning water-immiscible liquids suitable for producing fabric softener formulations. In the context of the present invention "water-immiscible" is to be understood as meaning that at room temperature aqueous mixtures of the oils at oil concentrations of 0.5%-99.5% by volume based on the overall mixture lead to cloudiness already perceptible to the human eye or to the formation of two or more phases. In addition, in the context of the present invention ester or mineral oils are preferably characterized in that they have an interfacial tension of >5 mN/m with respect to water. Ester or mineral oils may be based for example on oleochemistry or silicone chemistry.

Preferably the concentrates according to the invention contain ester or mineral oils selected from the group consisting of fatty acid esters, preferably esters of linear fatty acids with linear or branched fatty alcohols, esters of branched fatty acids with linear or branched fatty alcohols, esters of linear fatty acids with unbranched or branched polyhydric alcohols, esters of branched fatty acids with unbranched or branched polyhydric alcohols, esters of linear fatty acids with unbranched or branched alcohols, esters of branched fatty acids with unbranched or branched alcohols, esters of alkylhydroxycarboxylic acids with linear or branched fatty alcohols, mono-, di- or triglycerides in liquid or solid form, fatty alcohol esters, preferably esters of carboxylic acids, aromatic carboxylic acids or dicarboxylic acids with linear or branched fatty alcohols, unbranched or branched polyhydric alcohols or unbranched or branched alcohols, linear, cyclic or branched hydrocarbons, with or without substituents, with or without double bonds, vegetable oils, carbonates with unbranched or branched alcohols, ethers, with or without alkoxy groups, polydimethylsiloxanes, mixtures of the abovementioned oils in any ratios.

It is particularly preferable when esters of linear and/or branched fatty acids with linear and/or branched mono- or polyhydric alcohols, particularly preferably fatty alcohols, mono-, di- or triglycerides in liquid or solid form, esters of carboxylic acids, aromatic carboxylic acids or dicarboxylic acids with linear or branched fatty alcohols, unbranched or branched polyhydric alcohols or unbranched or branched alcohols, linear, cyclic or branched hydrocarbons, with or without substituents, with or without double bonds, vegetable oils, carbonates with unbranched or branched alcohols, are present.

It is very particularly preferable when
vegetable oils, carbonates with unbranched or branched alcohols,
linear, cyclic or branched hydrocarbons, with or without substituents, with or without double bonds,
esters of linear and/or branched fatty acids with linear and/or branched mono- or polyhydric alcohols, are present.

Likewise particularly preferred are the ester and mineral oils used in the oil phase in EP 2000123 A1. The contents of EP 2 000 123 A1 are hereby explicitly incorporated by reference into the description of the present application.

According to the invention, component C) is at least one nonionic surfactant.

Preferred nonionic surfactants are selected from the group containing, preferably consisting of,
addition products of ethylene oxide and/or propylene oxide onto linear fatty alcohols, fatty acids, fatty acid amides, fatty amines and alkylphenols, preferably fatty alcohol ethoxylates,
glycerol mono-, di- and triesters and sorbitan mono-, di- and triesters of saturated and unsaturated fatty acids and the ethylene oxide addition products thereof,
alkyl mono- and oligoglycosides and the ethylene oxide addition products thereof,
long-chain fatty alcohols having a mean chain length of 10 to 24, preferably 10 to 18 carbon atoms,
partial esters based on linear, branched, unsaturated and/or saturated fatty acids, ricinoleic acid, 12-hydroxystearic acid, polyglycerol, pentaerythritol, dipentaerythritol and sugar alcohols (e.g. sorbitol), polyglucosides (e.g. cellulose), mono-, di- and trialkyl phosphates and also mono-, di- and/or tri-PEG-alkyl phosphates and their salts, citric acid esters such as glyceryl stearate citrate, glyceryl oleate citrate and dilauryl citrate, for example,
further-alkoxylated triglycerides, mixed ethers and mixed formals, optionally partially oxidized alkyl oligoglycosides or alkenyl oligoglycosides or glucuronic acid derivatives, fatty acid N-alkylglucamides, and mixtures of these surfactants.

Likewise preferred nonionic surfactants as component C) are polyglycerol esters. The term "polyglycerol esters" in the context of the present invention includes partial polyglycerol esters, and hence compounds in which not all the hydroxyl groups have been esterified.

Preferably, in accordance with the invention, the polyglycerol ester of component C) is selected from those of the general formula V

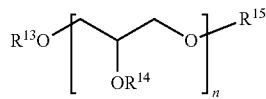

general formula 4
where
n=2 to 16, preferably 3-14, particularly preferably 4-11, and
$R^{13}$, $R^{14}$, $R^{15}$=are independently the same or different and are selected from H and a saturated or unsaturated, linear or branched acyl radical having 4-36 carbon atoms and optionally containing at least one hydroxyl group, especially selected from the acyl radicals of natural fatty acids.

The polyglycerol esters of the general formula 4 contain at least one acyl radical per molecule.

$R^{13}$ is preferably H and the $R^{14}$ and $R^{15}$ radicals are preferably H or acyl radicals of natural fatty acids. $R^{14}$ and $R^{15}$ may also represent mixtures of such acyl radicals, particularly technical mixtures, for example coconut fatty acid cuts.

For $R^{14}$ and $R^{15}$, it is especially preferred that, based on all the $R^{14}$ and $R^{15}$ radicals in the polyglycerol ester, at least 50 mol %, preferably at least 75 mol %, of the acyl radicals $R^{15}$ are selected from capryloyl, caproyl and lauroyl radicals.

The person skilled in the art is aware that the polyglycerol base skeleton present in the general formula 4, owing to its polymeric nature, is a random mixture of different compounds. Polyglycerol may have ether bonds between two primary, one primary and one secondary or else two secondary positions of the glycerol monomers. For this reason, the polyglycerol base skeleton does not usually consist exclusively of linearly linked glycerol units, but may also comprise branches and rings. For details see for example "Original synthesis of linear, branched and cyclic oligoglycerol standards", Cassel et al., J. Org. Chem., 2001, 875-896. Structures of this kind are covered in the general formula 4 which has been simplified in this respect.

The degree of polymerization n can be determined by determining the hydroxyl number of the polyglycerol used for synthesis of the inventive ester, where the mean degree of polymerization n is related to the hydroxyl number of the parent polyglycerol via the following equation:

$$n = \frac{\frac{2000 \cdot M(KOH)}{OHN} - M(\text{Water})}{\left[ [M(\text{Glycerol}) - M(\text{Water})] - \frac{1000 \cdot M(KOH)}{OHN} \right]}$$

where M=molar mass; OHN=hydroxyl number of the free polyglycerol.

Alternatively, the degree of polymerization n can also be calculated by determining the hydroxyl number of the polyglycerol obtained after complete ester hydrolysis.

Suitable methods for determining the hydroxyl number are particularly those according to DGF C-V 17 a (53), Ph. Eur. 2.5.3 Method A and DIN 53240.

Particularly preferred nonionic surfactants are addition products of ethylene oxide and/or propylene oxide onto linear fatty alcohols, fatty acids, fatty acid amides, fatty amines and alkylphenols.

Concentrates according to the invention contain as component D) a nonaqueous solvent preferably selected from the group containing, particularly preferably consisting of, hydrotropes, for example from the group of the monohydric and dihydric aliphatic alcohols, preferably of the aliphatic, linear or branched, mono- or divalent alcohols having 1 to 6 carbon atoms, such as ethanol, propanol, isopropyl alcohol, glycol ethers (available, for example, under the DOWANOL® name from Dow Chemicals), such as propylene glycol n-butyl ether, dipropylene glycol n-butyl ether, diethylene glycol monobutyl ether, for example, and polyols. Polyols which are contemplated here may possess 2 to 15 carbon atoms and at least two hydroxyl groups. Typical examples are: alkylene glycols, as for example ethylene glycol, diethylene glycol, propylene glycol, dipropylene glycol, butylene glycol, pentylene glycol, hexylene glycol, 1,2-propanediol, 1,3-propanediol, 1,2-butanediol, 1,2-pentanediol, 1,2-hexanediol and also polyethylene glycol or polypropylene glycol, butyl diglycol and mixtures of these solvents.

Especially preferably, the nonaqueous solvent D) is selected from the group consisting of isopropanol, glycol, 1,2-propylene glycol, 1,3-propylene glycol, butylene glycol, hexylene glycol, isopropylene glycol, propylene glycol n-butyl ether, dipropylene glycol n-butyl ether, dipropylene glycol monomethyl ether, dipropylene glycol n-propyl ether and diethylene glycol monobutyl ether.

As component F) the concentrates according to the invention may contain a mineral acid or an organic acid for adjusting the pH. However, it is particularly preferable when the concentrate contains as little water and acid as possible, most preferably no water and/or no acid.

The concentrates according to the invention are advantageously usable for production of or as laundry detergents or cleaning compositions, in particular as or in fabric softener formulations. Incorporation into a laundry detergent or cleaning composition provides the consumer with a fabric conditioning laundry detergent or cleaning composition ("2in1" laundry detergent or cleaning composition) and it is no longer necessary to dose two products (laundry detergent or cleaning composition and fabric softener) nor involve a separate rinsing cycle.

The laundry detergents or cleaning compositions, in particular the fabric softener formulations, according to the invention are suitable for the household, industrial and institutional sectors.

The addition of the concentrates according to the invention improves for example the soft hand and perfume release of the treated and/or cleaned objects. In this context the articles to be cleaned are preferably fabrics or fibres, especially those of a fibre or a fabric, specifically the surface of woven fabrics, laundry, especially laundry worn close to the body ("underwear"), cushions or carpets.

The use according to the invention may take place for example in the form of a process according to the invention for producing laundry detergents or cleaning compositions, in particular fabric softener formulations, which is characterized by the process steps of:
1) providing a concentrate according to the invention,
2) mixing with a water-containing phase preferably comprising at least one cationic, fabric-softening compound comprising one or more long-chain alkyl groups in a molecule, preferably a quaternary ammonium salt and/or a preservative and/or at least one perfume.

The present invention accordingly also provides for the use of the concentrates according to the invention in fabric conditioning and fabric care compositions, in particular in fabric-softening compositions (fabric softener) for the household and industry.

Preferred inventive laundry detergents or cleaning compositions, in particular fabric softener formulations, containing at least one concentrate according to the invention, are laundry detergents, laundry care products, disinfecting laundry detergents, heavy-duty laundry detergents, light-duty laundry detergents, wool laundry detergents, fabric softeners and impregnating agents, particular preference being given to laundry detergents, laundry care products, heavy-duty laundry detergents, light-duty laundry detergents, wool laundry detergents, fabric softeners, impregnating agents, especially fabric softeners.

Inventive laundry detergents or cleaning compositions, in particular fabric softener formulations, preferably contain the concentrate according to the invention in an amount of 0.1% by weight to 5% by weight, preferably 0.1% by weight to 2.5% by weight, where the % by weight values are based on the overall formulation. The remaining mass to 100% by weight preferably consists of water and/or at least one additive and/or assistant.

Commercially available fabric softeners are aqueous formulations containing as the main active ingredient one or more cationic fabric-softening compounds comprising one or more long-chain alkyl groups in a molecule. Widely used cationic fabric-softening compounds include, for example, methyl-N-(2-hydroxyethyl)-N,N-di(tallowacyloxyethyl) ammonium compounds or N,N-dimethyl-N,N-di(tallowacyloxyethyl)ammonium compounds. Further suitable ammonium compounds are disclosed by US 2010/0184634 in paragraphs [0027] to [0068], the explicit disclosure content of which in this regard is incorporated into this disclosure by this reference. The fabric softeners may moreover contain further additives and assistants, in particular perfume, colorants, viscosity regulators, defoamers, preservatives, organic solvents, non-siloxane-containing polymers. In particular the compositions according to the invention may contain between 0.001% and 25%, particularly preferably 0.01% to 15% by weight, of one or more different additives or assistants.

The perfume used may be any of the fragrances or fragrance mixtures known to be suitable for fabric softeners from the prior art, preferably in the form of a perfume oil. Examples of fragrances or scents are disclosed inter alia in DE 197 51 151 A1, page 4 lines 11-17. More particularly, the compositions according to the invention may contain from 0.01% to 10% by weight, particularly preferably 0.1% to 5% by weight, based on the overall composition of the composition, of one or more perfumes.

Dyes used may be any dyes known to be suitable for fabric softeners from the prior art, preference being given to water-soluble dyes. Examples of suitable water-soluble commercial dyes are SANDOLAN® Walkblau NBL 150 (manufacturer: Clariant) and Sicovit® Azorubin 85 E122 (manufacturer: BASF). More particularly, the compositions according to the invention may contain from 0.001% to 0.1% by weight, more preferably from 0.002% to 0.05% by weight, of one or more dyes.

The viscosity regulator for reducing viscosity may be an alkali metal or alkaline earth metal salt, or mixtures thereof, preferably calcium chloride, preferably in an amount of 0.05% to 2% by weight, based on the overall composition of the composition.

The viscosity regulator for increasing viscosity may be a thickener known from the prior art, preference being given to the polyurethane thickeners known from WO 2007/125005. Examples of suitable thickeners are TEGO® Visco Plus 3030 (Evonik Resource Efficiency GmbH), Acusol® 880 and 882 (Rohm & Haas), Rheovis® CDE (BASF), Rohagit® KF 720 F (Evonik Performance Materials GmbH) and Polygel® K100 from Neochem GmbH.

Defoamers used may be any defoamers known to be suitable from the prior art. Examples of suitable commercial defoamers are Dow Corning® DB-110A and TEGO® Antifoam® 7001 XP. In particular the compositions according to the invention may contain from 0.0001% to 0.05% by weight, preferably from 0.001% to 0.01% by weight, of one or more different defoamers.

The term "preservative" in the context of the present invention is to be understood as meaning an agent which effects preservation with respect to microbial, particularly bacterial, growth. As a preservative the fabric softener may contain active bactericidal and/or fungicidal ingredients known to be suitable from the prior art for example, preference being given to water-soluble active ingredients.

Examples of suitable commercial bactericides are methylparaben, 2-bromo-2-nitropropane-1,3-diol, 2-methyl-4-isothiazolin-3-one and 5-chloro-2-methyl-4-isothiazolin-3-one. The aqueous fabric softener may likewise contain an oxidation inhibitor as preservative. Examples of suitable commercial oxidation inhibitors are ascorbic acid, 2,6-di-tert-butyl-4-methylphenol (BHT), butylhydroxyanisole (BHA), tocopherol and propyl gallate. In particular the compositions according to the invention may contain from 0.0001% to 0.5%, more preferably 0.001% to 0.2% by weight, of one or more different preservatives. In particular the compositions according to the invention may contain from 0.001% to 0.1% by weight, preferably 0.001% to 0.01% by weight, of one or more different oxidation inhibitors.

As organic solvents the laundry and cleaning formulations, in particular the fabric softeners, may contain short-chain alcohols, glycols and glycol monoethers, preference being given to ethanol, 2-propanol, 1,2-propanediol and dipropylene glycol. In particular the compositions according to the invention may contain between 0.1% and 10%, particularly preferably 0.2% to 5% by weight, of one or more different organic solvents.

The laundry and cleaning formulations, in particular the fabric softeners, may contain one or more non-siloxane-containing polymers. Examples of these are carboxymethyl cellulose, polyethylene glycol, polyvinyl alcohol, poly (meth)acrylates, polyethyleneimines or polysaccharides. In particular the compositions according to the invention may contain between 0.01% and 25% by weight, particularly preferably 0.1% to 10% by weight, of one or more different non-siloxane-containing polymers.

One or more of the aforementioned additional components, preferably perfumes, emollients or insect repellents, can, however, also be incorporated into the concentrate, i.e. be a constituent of the concentrate. These components may accordingly be present as a constituent of the concentrate and/or as a separate constituent in the laundry and cleaning formulations according to the invention, in particular in fabric softener formulations.

The amounts of the particular additives and assistants are determined by the intended use. Typical boundary formulations for the respective applications are known prior art and are contained for example in the brochures of the manufacturers of the particular base and active ingredients. These existing formulations can generally be adopted unchanged. However, if required, for adjustment and optimization, the desired modifications can be undertaken by simple tests without complication.

The examples adduced hereinafter describe the present invention by way of example, without any intention that the invention, the scope of application of which is apparent from the entirety of the description and the claims, be restricted to the embodiments specified in the examples.

D. PRODUCTION EXAMPLES FOR CONCENTRATES

General Instructions:

For producing the concentrates according to the invention, components A to D and optionally E and F were stirred together at room temperature and without expending much energy in the amounts specified in table 1 below. All the amounts stated in table 1 are percent by mass values based on the overall mass of the concentrate. A clear concentrate was formed in all the inventive examples.

The following components were used:
Component a (Organo-Modified Silicone):
N-containing polysiloxane (amino/guanidino-modified siloxane—as per EP2557107A1) referred to hereinbelow as polysiloxane 1,
N-containing polysiloxane (amino-modified siloxane, ABIL SOFT AF 300, aminopropyl dimethicone, Evonik Nutrition & Care GmbH)
alkyl- and polyether-modified siloxane (TEGOPREN 7009, cetyl dimethicone copolyol, Evonik Nutrition & Care GmbH)
alkyl-modified siloxane (ABIL WAX 9840, cetyl dimethicone, Evonik Nutrition & Care GmbH)
Component B (Ester Oil):
REWOCARE DOC (diethylhexyl carbonate, Evonik Nutrition & Care GmbH);
Tegosoft DEC (diethylhexyl carbonate, Evonik Nutrition & Care GmbH);
Tegosoft M (isopropyl myristate, Evonik Nutrition & Care GmbH);
Loxanol® MI 6460 (isopropyl laurate, BASF)
Tegosoft P (isopropyl palmitate, Evonik Nutrition & Care GmbH)
isopropyl oleate
rape diesel (rapeseed methyl ester)
olive oil (vegetable oil)
Component C (Surfactant):
Tomadol 23-1 (ethoxylated linear alcohol having on average 1 ethylene oxide group per molecule and a molar mass of 238; nonionic surfactant, Evonik Nutrition & Care GmbH)
Tomadol 1-5 (ethoxylated linear alcohol having on average 5 ethylene oxide groups per molecule and a molar mass of 392; nonionic surfactant, Evonik Nutrition & Care GmbH)
Tomadol 23-5 (ethoxylated linear alcohol having on average 5 ethylene oxide groups per molecule and a molar mass of 401; nonionic surfactant, Evonik Nutrition & Care GmbH)
Tomadol 23-3 (nonionic surfactant, Evonik Nutrition & Care GmbH)
TEGO Alkanol TD 6 (isotridecyl 6-ethoxylate; Evonik Nutrition & Care GmbH)
Lial 123 (C12-C13-Alcohol; Sasol)
TEGO Alkanol S2P (Steareth-2, Evonik Nutrition & Care GmbH)
Tego STO V (sorbitan trioleates, Evonik Nutrition & Care GmbH)
Tego SMO V (sorbitan oleates, Evonik Nutrition & Care GmbH)
Lutensol TO 2 (ethoxylated iso-C13-alcohol having an average of 2 ethylene oxide groups, BASF)
Tomadol 1200 (ethoxylated nonionic surfactant, Evonik Nutrition & Care GmbH)
Tergitol 15-S-3 (ethoxylated nonionic surfactant, ethoxylate of a secondary alcohol, The Dow Company)
Tego Care PSC 3 (polyglyceryl-3 dicitrate/stearate, Evonik Nutrition & Care GmbH)
Component D (Solvent):
Propylene glycol n-butyl ether (Dowanol PnB; The Dow Company)
Dipropylene glycol n-butyl ether (Dowanol DPnB; The Dow Company)
dipropylene glycol monomethyl ether (Dowanol DPM; The Dow Company)
dipropylene glycol n-propyl ether (Dowanol DPnP; The Dow Company)
isopropanol
hexylene glycol BDG (diethylene glycol monobutyl ether, butyl diglycol, BASF)
Component E:
water
Component F (Optional Additive):
HCl solution, 20% in water, abbreviated to HCl hereinbelow

TABLE 1

| Component | B1 | B2 | B3 | B4 | B5 | B6 | B7 | B8 | B9 | B 10 |
|---|---|---|---|---|---|---|---|---|---|---|
| Polysiloxane 1 | 55 | 48 | 49.4 | 56.1 | 55.0 | 55.0 | 55.0 | 62.5 | 55.0 | 62.5 |
| Dowanol PnB | 12.5 | 12 | 12.3 | 1.7 | 12.5 | 12.5 | 12.5 | 5.0 | 12.5 | 5.0 |
| Tegosoft M | 25 | | | 31.0 | 25.0 | 25.0 | 25.0 | 25.0 | 25.0 | 25.0 |
| Rewocare DOC | | 28 | 24.8 | | | | | | | |
| Tomadol 23-1 | 7.5 | 12 | 12.3 | 11.2 | 5.0 | | | 7.5 | | |
| Tomadol 23-3 | | | | | 2.5 | | | | | |
| Tomadol 1-5 | | | | | | 2.5 | 1.0 | | | |
| Lial 123 | | | | | | 5.0 | 6.5 | | 6.5 | 6.5 |
| Tego Alkanol S2P | | | | | | | | | 1.0 | 1.0 |
| HCl, 20% | | | 1.2 | | | | | | | |
| Total | 100 | 100 | 100 | 100 | 100 | 100 | 100 | 100 | 100 | 100 |
| Appearance immediately after production | clear | clear | clear | clear | clear | clear | clear | clear | clear | clear |
| Stability in weeks at RT* | >56 | >17 | >2 | >4 | >42 | >57 | >56 | >56 | >4 | >4 |
| Stability in weeks at 40° C.* | >56 | >17 | >2 | >4 | >42 | >57 | >56 | >56 | >4 | >4 |
| Appearance after storage at RT | clear | slightly opaque | slightly cloudy | clear | clear | clear | clear | clear | clear | clear |
| Appearance after storage at 40° C. | clear | slightly opaque | cloudy | clear | clear | clear | clear | clear | clear | clear |

| Component | B11 | B12 | B13 | B14 | B15 | B16 |
|---|---|---|---|---|---|---|
| Polysiloxane 1 | 55 | 60 | 65 | 70 | 72.5 | 75 |
| Dowanol PnB | 12.5 | 12.5 | 12.5 | 12.5 | 10 | 7.5 |
| Tomadol 1-5 | 1 | 1 | 1 | 1 | 1 | 1 |
| Lial 123 | 6.5 | 6.5 | 6.5 | 6.5 | 6.5 | 6.5 |
| Loxanol MI 6460 | 25 | 20 | 15 | 10 | 10 | 10 |
| Total | 100 | 100 | 100 | 100 | 100 | 100 |
| Appearance immediately after production | clear | clear | clear | clear | clear | clear |
| Stability in weeks at RT* | >52 | >52 | >52 | >52 | >51 | >51 |
| Stability in weeks at 40° C.* | >52 | >52 | >52 | >52 | >51 | >51 |
| Appearance after storage at RT | clear | Clear | clear | clear | clear | clear |
| Appearance after storage at 40° C. | clear | clear | clear | clear | clear | clear |

| Component | B17 | B18 | B19 | B20 | B21 | B22 |
|---|---|---|---|---|---|---|
| TEGOPREN 7009 | 60 | 70 | 75 | | | |
| ABIL Wax 9840 | | | | 60 | 70 | 75 |
| Dowanol PnB | 12.5 | 12.5 | 12.5 | 12.5 | 12.5 | 12.5 |
| Tomadol 1-5 | 1 | 1 | 1 | 1 | 1 | 1 |
| Lial 123 | 6.5 | 6.5 | 6.5 | 6.5 | 6.5 | 6.5 |
| Loxanol MI 6460 | 20 | 10 | 5 | 20 | 10 | 5 |
| Total | 100 | 100 | 100 | 100 | 100 | 100 |
| Appearance immediately after production | clear | clear | clear | clear | clear | clear |
| Stability in weeks at RT* | >51 | >51 | >50 | >50 | >50 | >50 |
| Stability in weeks at 40° C.* | >51 | >51 | >50 | >50 | >50 | >50 |
| Appearance after storage at RT | clear | clear | clear | clear | clear | clear |
| Appearance after storage at 40° C. | clear | clear | clear | clear | clear | clear |

| Component | B23 | B 24 | B 25 | B 26 | B 27 |
|---|---|---|---|---|---|
| ABIL Soft AF 300 | 60 | | | | |
| Polysiloxane 1 | | 65 | 70 | 65 | 70 |
| Dowanol PnB | 12.5 | | | | |
| Dowanol DPnB | | 12.5 | 12.5 | 12.5 | 12.5 |

TABLE 1-continued

| | | | | | |
|---|---|---|---|---|---|
| Tomadol 1-5 | 1 | 1 | 1 | 1 | 1 |
| Lial 123 | 6.5 | 6.5 | 6.5 | 6.5 | 6.5 |
| Isopropyl laurate | 20 | 15 | 10 | | |
| Isopropyl oleate | | | | 15 | 10 |
| Total | 100 | 100 | 100 | 100 | 100 |
| Appearance immediately after production | clear | clear | clear | clear | clear |
| Stability in weeks at RT* | >50 | >49 | >16 | >16 | >16 |
| Stability in weeks at 40° C.* | >50 | >49 | >16 | >16 | >16 |
| Appearance after storage at RT | clear | clear | clear | clear | clear |
| Appearance after storage at 40° C. | clear | clear | clear | clear | clear |

| Component | B28 | B29 | B30 | B31 | B32 |
|---|---|---|---|---|---|
| Polysiloxane 1 | 41.7 | 41.5 | 49.2 | 48.2 | 27.2 |
| Dowanol PnB | 15.6 | 10.4 | 12.3 | 12.0 | 13.6 |
| Isopropanol | 10.4 | 10.4 | | | 25.2 |
| Tomadol 1200 | | | | | 3.4 |
| Tergitol 15-S-3 | 10.4 | | | | 6.8 |
| Tomadol 23-1 | | 5.2 | 12.3 | 12.0 | |
| Rewocare DOC | 20.8 | 31.1 | 24.6 | | 23.1 |
| Tegosoft M | | | | 27.7 | |
| 20% hydrochloric acid | 1.0 | 1.6 | 1.6 | | 0.7 |
| Total | 100.0 | 100.0 | 100.0 | 100.0 | 100.0 |
| Appearance immediately after production | clear | clear | clear | clear | clear |
| Stability in weeks at RT* | >2 | >2 | >2 | >2 | >2 |
| Stability in weeks at 40° C.* | — | — | >2 | >2 | — |
| Appearance after storage at RT | clear | clear | clear | clear | clear |
| Appearance after storage at 40° C. | — | — | clear | clear | — |

| Component | B33 | B34 | B35 | B36 | B37 |
|---|---|---|---|---|---|
| Polysiloxane 1 | 55.0 | 60.0 | 60.0 | 60.0 | 60.0 |
| Dowanol PnB | 12.5 | 7.5 | | | |
| Dowanol DPnB | | | 12.5 | | |
| Dowanol DPM | | | | 12.5 | |
| Dowanol DPnP | | | | | 12.5 |
| Tomadol 1-5 | 1.0 | 1.0 | 1.0 | 1.0 | 1.0 |
| Lial 123 | 6.5 | 6.5 | 6.5 | 6.5 | 6.5 |
| Tegosoft P | 25.0 | | | | |
| Isopropyl laurate | | | 20.0 | 20.0 | 20.0 |
| Isopropyl oleate | | 25.0 | | | |
| Total | 100.0 | 100.0 | 100.0 | 100.0 | 100.0 |
| Appearance at RT | clear | clear | clear | clear | clear |
| Stability in weeks at RT* | >2 | >2 | >45 | >2 | >45 |
| Stability in weeks at 40° C.* | >2 | >2 | >45 | >2 | >45 |
| Appearance after storage at RT | clear | clear | clear | clear | clear |
| Appearance after storage at 40° C. | clear | clear | clear | clear | clear |

| Component | B38 | B39 | B40 | B41 | B42 |
|---|---|---|---|---|---|
| Polysiloxane 1 | 65.0 | 69.5 | 68.0 | 57.5 | 65.0 |
| Dowanol DPnB | | 13.4 | 12.5 | 12.5 | 12.5 |
| Isopropanol | 12.5 | | | | |
| Tomadol 1-5 | 1.0 | | | | 1.0 |
| Lial 123 | 6.5 | | 3.5 | | 6.5 |
| Lutensol TO2 | | | | 5.0 | |

TABLE 1-continued

|  |  |  |  |  |  |
|---|---|---|---|---|---|
| Tego STO V |  | 1.1 | 1.0 |  |  |
| Isopropyl laurate | 15.0 | 16.0 | 15.0 | 25.0 | 13.0 |
| Rapeseed methyl ester |  |  |  |  | 2 |
| Total | 100.0 | 100.0 | 100.0 | 100.0 | 100.0 |
| Appearance at RT | clear | clear | clear | clear | clear |
| Stability in weeks at RT* | >2 | >2 | >2 | >2 | >2 |
| Stability in weeks at 40° C.* | — | >2 | >2 | >2 | >2 |
| Appearance after storage at RT | clear | clear | clear | clear | clear |
| Appearance after storage at 40° C. | — | clear | clear | clear | clear |

| Component | B43 | B44 | B45 | B46 | B47 | B48 |
|---|---|---|---|---|---|---|
| Polysiloxane 1 | 41.5 | 41.5 | 41.5 | 41.5 | 65.0 | 65.0 |
| Dowanol PnB | 10.4 | 10.4 | 10.4 | 10.4 |  |  |
| Dowanol DPnB |  |  |  |  | 11.5 | 11.5 |
| Isopropanol | 10.4 | 10.4 | 10.4 | 10.4 |  |  |
| Hexylene glycol |  |  |  |  |  | 1.0 |
| Butyl diglycol |  |  |  |  | 1.0 |  |
| Tomadol 23-1 | 5.2 | 5.2 | 5.2 | 5.2 |  |  |
| Tomadol 1-5 |  |  |  |  | 1.0 | 1.0 |
| Lial 123 |  |  |  |  | 6.5 | 6.5 |
| Tegosoft DEC | 32.5 | 31.5 | 31.5 | 31.5 |  |  |
| Isopropyl laurate |  |  |  |  | 15.0 | 15.0 |
| Olive oil |  | 1.0 |  |  |  |  |
| Tego SMO |  |  | 1.0 |  |  |  |
| Tego Care PSC 3 |  |  |  | 1.0 |  |  |
| Appearance at RT | clear | clear | clear | clear | clear | clear |
| Stability in weeks at RT* | >2 | >2 | >2 | >2 | >2 | >2 |
| Stability in weeks at 40° C.* | — | — | — | — | >2 | >2 |
| Appearance after storage at RT | clear | clear | clear | clear | clear | clear |
| Appearance after storage at 40° C. | — | — | — | — | clear | clear |

*stability is to be understood as meaning that the respective sample showed neither phase separation nor visible yellowing nor a viscosity increase over the reported period. The periods reported in table 1 are the periods elapsed before submission of the patent application where the experiments are still running. Since all experiments are still running a markedly lengthier stability is assumed in each case.

COMPARATIVE EXAMPLE

A microemulsion according to EP2557107A1 was used as a comparative example. The composition is shown in table 2.

TABLE 2

|  | Comparative Example |
|---|---|
| Polysiloxane 1 | 43 |
| Tego Alkanol TD 6 | 16 |
| BDG | 8 |
| DPnB | 8 |
| Water | 25 |
| Total | 100 |
| Appearance immediately after production | clear |
| Stability in weeks at RT | 10 weeks |
| Stability at 40° C. | cloudy/biphasic after 3 weeks |

The comparative example shows that concentrates according to EP2557107A1 do not exhibit sufficient storage stability at higher temperatures since phase separation took place.

E USE EXAMPLES

E1 Production of Fabric Softener Compositions

To produce the fabric softener formulations for the comparative examples V1 and V2, REWOQUAT WE 18 (trade name of Evonik Nutrition & Care GmbH, triethanol-based esterquat having an active content of 90%) heated to 50° C. in the amount reported in table 3 was added with stirring to the amount reported in table 3 of tapwater heated to 35° C. and to the amount reported in table 3 of 1% dye solution. This was followed by stirring using a propeller stirrer at 50° C. for 20 minutes. The dispersion was cooled to room temperature over about one hour. 3 g of perfume oil were then added at room temperature.

Comparative example V3 was performed analogously to V1 and V2 except that the mixture was cooled to 30° C. over 20 minutes and then in the final step in addition to the perfume oil an aminosiloxane microemulsion according to EP 2 557 107 A1 was added in the amount reported in table 3. The microemulsion had the composition reported in table 2:

Inventive fabric softener formulations W1 and W2 were produced analogously to V3 with the exception that in the final step instead of the microemulsion according to table 2 inventive concentrates from the examples B1 and B2 were added. The compositions of the fabric softeners V1 to V3 and W1 to W2 are summarized in table 3:

TABLE 3

| % | V1 Concentration of WE 18 = 6% | V2 Concentration of WE 18 = 8% | V3 Concentration of WE 18 = 6% | W1 Concentration of WE 18 = 6% | W2 Concentration of WE 18 = 6% |
|---|---|---|---|---|---|
| REWOQUAT WE 18 | 33 g | 44 g | 33 g | 33 g | 33 g |
| Tap water | 462.8 g | 451.8 g | 455.7 g | 457.3 g | 456.5 g |
| Dye solution | 1.2 | 1.2 | 1.2 | 1.2 | 1.2 |
| Microemulsion Concentrate | — | — | 0.6 | 0.6 from B1 | 0.6 from B2 |
| Perfume oil | 3 g | 3 g | 3 g | 3 g | 3 g |

E2 Pretreatment of the Cotton Fabric

Cotton terrycloth fabric (WFK Test Fabric WFK 12 A) of size 80 cm×50 cm with a basis weight of about 350 g/m² was washed twice with heavy-duty laundry detergent at 40° C., rinsed twice, spun and dried in air hanging on a line in a single ply.

E3 Soft Hand

To determine the softening activity of the inventive concentrates on fabrics the cotton towels from E2 were treated with the fabric softeners V1-3, W1 and W2.

E3.1 Treatment of the Cotton Fabric

The fabric softeners of table 3 were each diluted with cold tap water to afford a rinse solution containing 0.025% by weight of active fabric conditioning substances.

The cotton towels were immersed in 2 litres of the rinse solution for 10 minutes. It should be ensured here that the towels are wetted homogeneously by the rinse solution. Subsequently, the towels were spun and dried at room temperature hanging on a line in a single ply. The treated cotton terrycloth towels were cut into 10 identical pieces of 16 cm×25 cm.

E3.2 Assessment of Soft Hand

To assess soft hand, an experienced team of 9 individual testers was assembled, who used a hand panel test to evaluate the anonymized hand specimens from E3.1. In this test, each tester receives their own cotton towel. The assessment is made on a scale from 0 (hard and unpleasant feel) to 5 (soft and pleasant feel) with the option of intervening integer values. For the assessment of soft hand, the individual evaluations were added up, meaning that, with 9 testers, a maximum soft hand value of 45 is possible.

For the hand specimens, in addition, an untreated sample without obvious marking (blank value) was always included.

The results of the assessment of soft hand are reported in Table 4.

TABLE 4

Summary of the soft hand results

| Cotton fabric treated with fabric softener | Soft hand |
|---|---|
| V1 | 29 |
| V2 | 34 |
| V3 | 34 |
| W1 | 31 |
| W2 | 34 |

Table 4 shows that fabric softener formulations W1 and W2 containing 0.6% by weight of the inventive concentrates exhibit a better soft hand than the fabric softener V1 without the inventive concentrates. To achieve a soft hand comparable with W2 without use of the inventive concentrates the WE18 concentration in V2 had to be increased by up to 30% compared to V1 (V1: 6% by weight and V2: with 8% by weight). The use of the inventive concentrates is thus markedly more efficient.

E4 Perfume Retention

To determine the perfume retention effect of the microemulsions containing perfume on fabrics, cotton towels were treated therewith.

E4.1 Treatment of the Cotton Fabric

Cotton fabric was treated analogously to E3.1.

E2.3.2 Assessment of Perfume Retention

To assess perfume retention an experienced team of 11 individual testers was assembled and used an odour panel test to assess the anonymized odour specimens of the cotton fabric treated with the fabric softeners V1, V3, W1 and W2. In this test, each tester receives their own cotton towel. No more than two different cloths were assessed relative to one another in one odour panel. The assessment was made on a scale from 1 (less intense) to 2 (more intense) with the option of intervening integer values in the final total for all test persons. For the assessment of odour, the individual evaluations were added up, meaning that, with 11 testers, a maximum value of 22 is possible. The assessment of perfume retention was made 24 h after the treatment of the fabrics and after 7 days.

The results are summarized in Table 5:

TABLE 5

Summary of results for perfume retention

| Cotton fabric treated with fabric softener | Result for perfume retention after 24 h | Result for perfume retention after 7 days |
|---|---|---|
| V1 | 14 | 12 |
| V3 | 18 | 16 |
| W1 | 18 | 18 |
| W2 | 19 | 18 |

The results in table 5 show that fabric softeners containing the inventive concentrates exhibit the best perfume retention, especially after 7 days.

The invention claimed is:

1. A concentrate comprising components A-F as follows:
   A) one or more polysiloxanes selected from the group consisting of: polyether siloxanes; amino-functional polysiloxanes; polysiloxanes having long-chain alkyl radicals; and mixtures of thereof; wherein all polysiloxanes, in total, comprise 20% by weight to 80% by weight;
   B) one or more ester oils or mineral oils, wherein all ester oils and mineral oils, in total, comprise 5% by weight to 50%;

C) one or more nonionic surfactants, wherein all nonionic surfactants, in total, comprise 1% by weight to 25%;
D) one or more hydrotropic nonaqueous solvents, or a mixture of hydrotropic, non-aqueous solvents selected from the group consisting of: mono- and dihydric aliphatic alcohols; glycol ethers; and polyols, wherein all solvents, in total, comprise 0.1% by weight to 50% by weight;
E) optionally water wherein the water comprises 0% by weight to 3% by weight;
F) optionally one or more acids wherein all acids, in total, comprises 0% by weight to 3% by weight;

wherein:
the content of components E) and F) in total, based on the overall weight of the concentrates, is between 0 and 5% by weight; and
the % by weight values are based on the overall composition of the concentrate and the amounts of the individual components A) to F), and optionally further components, are chosen such that in total they add up to 100% by weight of the concentrate.

2. The concentrate of claim 1, wherein component A) is a polysiloxane of formula 1:

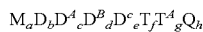 (formula 1), wherein:
$M=[R^2R^1{}_2SiO_{1/2}]$
$D=[R^1{}_2SiO_{2/2}]$
$D^A=[R^1Si(R^7NHR^3)O_{2/2}]$
$D^B=[R^1SiR^4O_{2/2}]$
$D^C=[R^1SiR^5O_{2/2}]$
$T=[R^1SiO_{3/2}]$
$T^A=[Si(CH_2CH_2CH_2NHR^3)O_{3/2}]$
$Q=[SiO_{4/2}]$
where:
$R^1$ are independently of one another identical or different, linear or branched, saturated or unsaturated hydrocarbon radicals having 1 to 30 carbon atoms or are aromatic hydrocarbon radicals having 6 to 30 carbon atoms;
$R^2$ are independently of one another identical to $R^1$, a linear or branched, saturated or unsaturated alkoxy radical having 1 to 30 carbon atoms, or are a hydroxyl group;
$R^3$ are independently of one another hydrogen or a nitrogen-substituted hydrocarbon radical having 1 to 30 carbon atoms;
$R^4$ are independently of one another identical or different, linear or branched, saturated or olefinically unsaturated hydrocarbon radicals having 8 to 30 carbon atoms;
$R^5$ are independently of one another identical or different, linear or branched, saturated or unsaturated polar hydroxyl-substituted amide radicals having 1 to 30 carbon atoms and/or linear or branched, saturated or unsaturated polar hydroxyl-substituted urea derivatives having 1 to 30 carbon atoms and/or hydroxyl-substituted carbamate radicals having 1 to 30 carbon atoms and/or ethoxylated amine radicals having 1 to 30 carbon atoms and/or guanidine radicals or alkylenylguanidine radicals having 1 to 30 carbon atoms;
$R^7$ are independently of one another identical or different, linear or branched, saturated or unsaturated, divalent hydrocarbon groups having 1 to 20 carbon atoms;
a is 2 to 20;
b is 10 to 5000;
c is 1 to 500;
d is 0 to 500;
e is 0 to 500;
f is 0 to 20;
g is 0 to 20;
h is 0 to 20;
or ionic adducts thereof with protic reactants $H^+A^-$.

3. The concentrate of claim 2, wherein $R^5$ is selected from the group of substituents of formulae 1a to 1j:

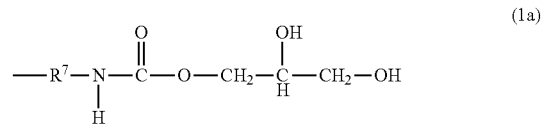 (1a)

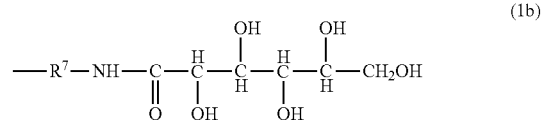 (1b)

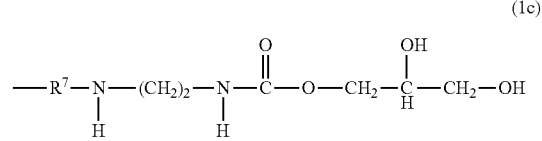 (1c)

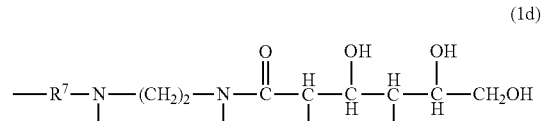 (1d)

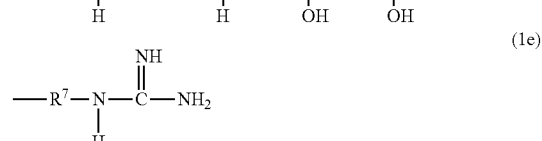 (1e)

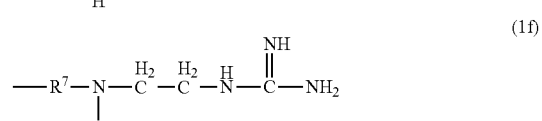 (1f)

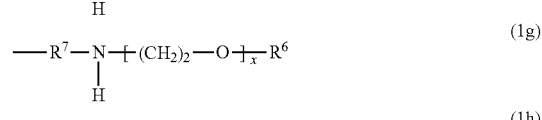 (1g)

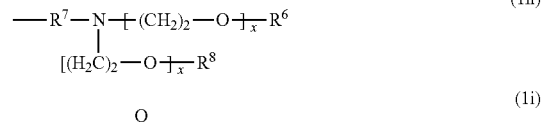 (1h)

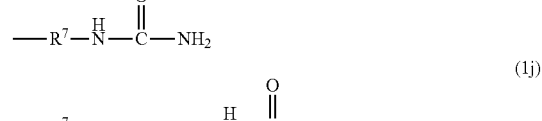 (1i)

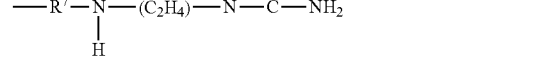 (1j)

wherein $R^6$ is hydrogen, a hydrocarbon radical, an acyl radical, a carboxylate radical or a carbamate or carbonate radical, and x is to 1 to 20.

4. The concentrate of claim 3, wherein: $R^1$ is a methyl phenyl radical; $R^2$ is a methyl radical; $R^3$ is hydrogen; $R^4$ is hexadecyl- or octadecyl-; $R^7$ is $C_3H_6$; a is 2; b is 20 to 1000; c is 1 to 30; d is 0 to 30; e is 1 to 30; f is 0; g is 0; and h is 0.

5. The concentrate of claim 1, wherein component A) is a polysiloxane of formula 2:

 (formula 2)

wherein:
M=[R²R¹₂SiO₁/₂]
M¹=[R¹R¹⁰₂SiO₁/₂]
D=[R¹₂SiO₂/₂]
D¹=[R¹R¹⁰SiO₂/₂]
D²=[R¹R¹³SiO₂/₂]
T=[R¹SiO₃/₂]
Q=[SiO₄/₂]
where:
i is 0 to 20;
j is 0 to 20;
k is 3 to 450;
is 0 to 60;
m is 0 to 60;
n is 0 to 20;
o is 0 to 20;
wherein: i+j≥2 and N=i+j+k+l+m+n≤500, j+l+m≥1;
R¹ are independently of one another identical or different, linear or branched, saturated or unsaturated hydrocarbon radicals having 1 to 30 carbon atoms or are aromatic hydrocarbon radicals having 6 to 30 carbon atoms;
R² are independently of one another identical to R¹, an alkoxy radical or a hydroxyl group;
R¹⁰ are independently of one another identical or different polyether radicals R¹³ are independently of one another identical or different, linear or branched, saturated or olefinically unsaturated hydrocarbon radicals having 8 to 30 carbon atoms.

6. The concentrate of claim 5, wherein R¹⁰ are independently of one another identical or different polyether radicals of general formula 3:

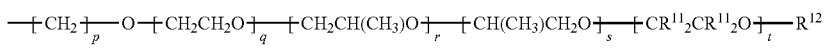

Formula 3 wherein:
R¹¹ are identical or different alkyl radicals having 1 to 18 carbon atoms and optionally having ether functions or aryl radicals having 6-18 carbon atoms and optionally having ether functions or hydrogen;
R¹² are identical or different radicals from the group: R¹, hydrogen, —C(O)R¹;
p is 2 to 18;
q is 0 to 100;
r is 0 to 100;
s is 0 to 100;
t is 0 to 80;
with the proviso that q+r+s+t≥3.

7. The concentrate of claim 6, wherein:
i is 2 to 3;
j is 0 to 2;
k is 10 to 250;
is 0 to 30;
m is 0 to 30;
n is 0 to 2; and
o is 0 to 2.

8. The concentrate of claim 1, wherein component B) are ester oils or mineral oils, which are:
immiscible with water such that, at room temperature, aqueous mixtures of the oils, at oil concentrations of 0.5-99.5% by volume based on the total mixture, have a cloudiness perceptible to the human eye or a formation of two or more phases; and/or
have an interfacial tension to water of >5 mN/m.

9. The concentrate of claim 1, wherein component B) is selected from the group consisting of:
esters of linear and/or branched fatty acids with linear and/or branched mono- or polyhydric alcohols;
mono-, di- or triglycerides in liquid or solid form;
esters of carboxylic acids, aromatic carboxylic acids or dicarboxylic acids with linear or branched fatty alcohols, unbranched or branched polyhydric alcohols or unbranched or branched alcohols;
linear, cyclic or branched hydrocarbons, with or without substituents, with or without double bonds;
vegetable oils;
carbonates with unbranched or branched alcohols; and
mixtures of ester oils and mineral oils mentioned above.

10. The concentrate of claim 1, wherein component C) is selected from the group consisting of:
addition products of ethylene oxide and/or propylene oxide to linear fatty alcohols, fatty acids, fatty acid amides, fatty amines and to alkylphenols;
glycerol mono-, -di- and -triesters and sorbitan mono-, -di- and -triesters of saturated and unsaturated fatty acids and ethylene oxide addition products thereof;
alkyl mono- and -oligoglycosides and ethylene oxide addition products thereof;
long-chain fatty alcohols having a mean chain length of 10 to 24, carbon atoms;
partial esters based on linear, branched, unsaturated or saturated fatty acids, ricinoleic acid, 12-hydroxystearic acid, polyglycerol, pentaerythritol, dipentaerythritol and sugar alcohols, polyglucosides, mono-, di- and trialkyl phosphates and also mono-, di- and/or tri-PEG-alkyl phosphates and salts thereof, and citric acid esters;
further alkoxylated triglycerides, mixed ethers and mixed formulas, optionally partially oxidized alkyl oligoglycosides or alkenyl oligoglycosides or glucoronic acid derivatives, fatty acid N-alkylglucamides, polyglycerol esters;
mixtures of nonionic surfactants specified above.

11. The concentrate of claim 1, wherein the percentage of each component is as follows:
A) all polysiloxanes, in total, comprise 30% by weight to 80% by weight;
B) all ester oils and mineral oils, in total, comprise 5% by weight to 35% by weight;
C) all nonionic surfactants, in total, comprise 2% by weight to 15% by weight;
D) all solvents, in total, comprise 0.1% by weight to 30% by weight;
E) water comprises 0% by weight to 1% by weight; and
F) all acids, in total, comprise 0% by weight to 1% by weight;
wherein the % by weight values are based on the overall composition of the concentrate and the amounts of the individual components A) to F) and optionally further components are chosen such that in total they add up to 100% by weight of the concentrate.

12. The concentrate of claim 1, wherein the percentage of each component is as follows:

A) all polysiloxanes, in total, comprise 45% by weight to 75% by weight;
B) all ester oils and mineral oils, in total, comprise 10% by weight to 35% by weight;
C) all nonionic surfactants, in total, comprise 5% by weight to 15% by weight;
D) all solvents, in total, comprise 1% by weight to 15% by weight;
E) water comprises 0% by weight; and
F) all acids, in total, present comprise 0% by weight;
wherein the % by weight values are based on the overall composition of the concentrate and the amounts of the individual components A) to F) and optionally further components are chosen such that in total they add up to 100% by weight of the concentrate.

13. A process for producing a laundry or cleaning formulation, comprising:
  a) providing the concentrate of claim 1;
  b) mixing said concentrate with a water-containing phase, wherein the water-containing phase comprises at least one cationic, fabric-softening compound comprising one or more long-chain alkyl groups in a molecule.

14. The process of claim 13, wherein the water-containing phase comprises at least one quaternary ammonium salt and/or a preservative and/or at least one perfume.

15. The process of claim 14, wherein the percentage of each component in the concentrate is as follows:
A) all polysiloxanes, in total, comprise 45% by weight to 75% by weight;
B) all ester oils and mineral oils, in total, comprise 10% by weight to 35% by weight;
C) all nonionic surfactants, in total, comprise 5% by weight to 15% by weight;
D) all solvents, in total, comprise 1% by weight to 15% by weight;
E) water comprises 0% by weight; and
F) all acids, in total, present comprise 0% by weight;
wherein the % by weight values are based on the overall composition of the concentrate and the amounts of the individual components A) to F) and optionally further components are chosen such that in total they add up to 100% by weight of the concentrate.

* * * * *